June 27, 1950     L. F. WINSLOW     2,513,073
PNEUMATIC SEPARATOR

Filed Aug. 29, 1947     3 Sheets-Sheet 1

Inventor
Leonard F. Winslow.
By Mason & Hatfield
Attorneys.

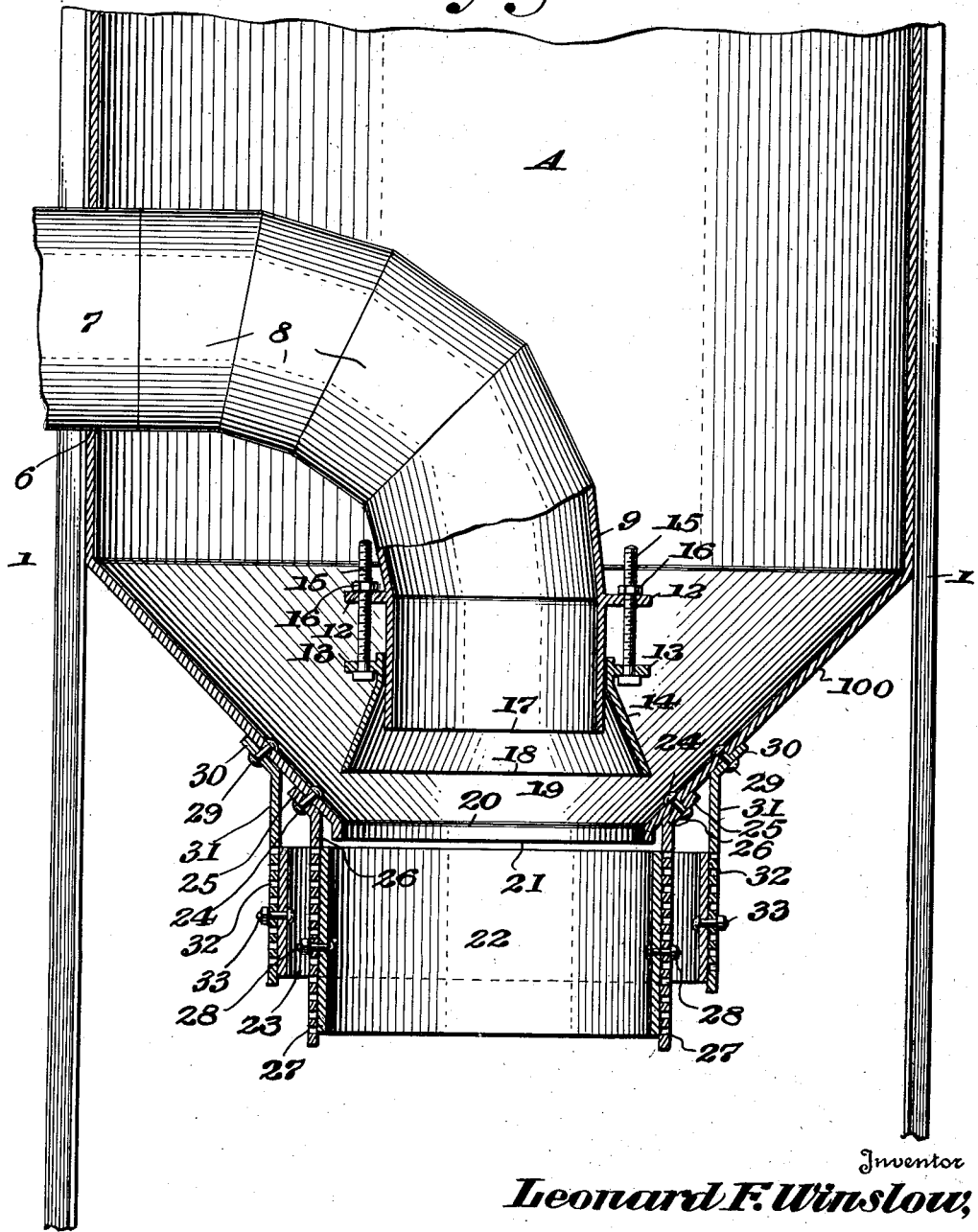

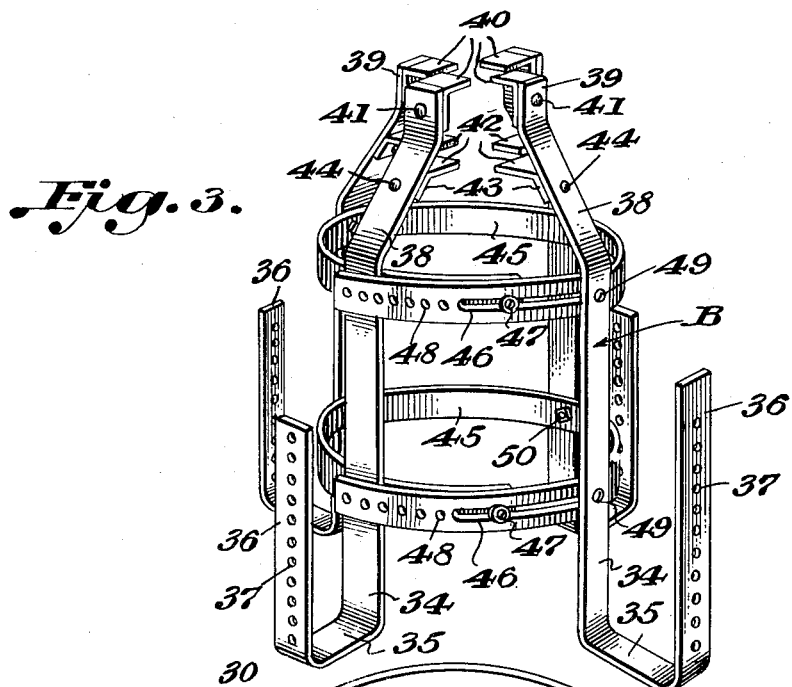
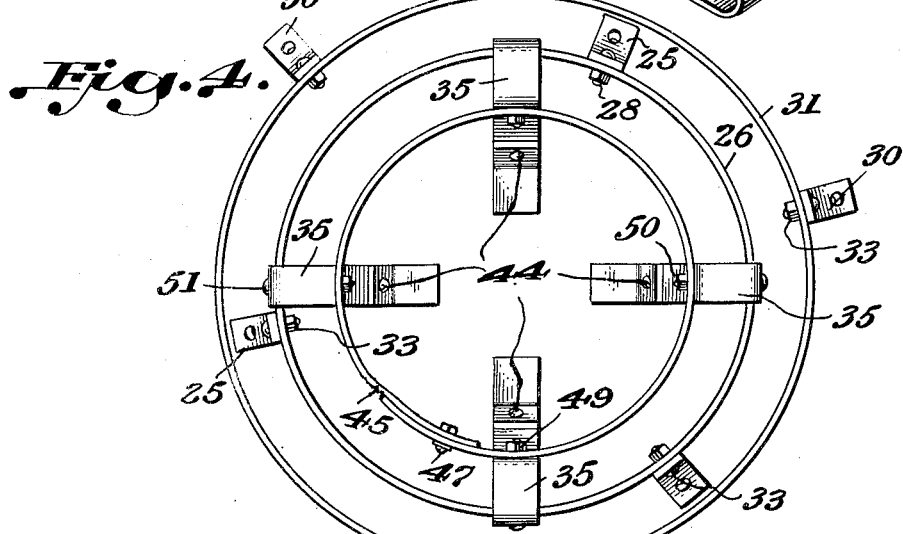

Patented June 27, 1950

2,513,073

UNITED STATES PATENT OFFICE 2,513,073

PNEUMATIC SEPARATOR

Leonard F. Winslow, Richmond, Va.

Application August 29, 1947, Serial No. 771,242

8 Claims. (Cl. 209—138)

This invention is addressed to a separator for separating all types of agricultural materials.

An object of the invention is to provide a separator for separating light material, and which may be adjusted for separating material having comparatively heavy constituents, such as grains, from lighter material such as grain hulls.

A further object of the invention is to separate peanut hulls from sheep burs and peanuts, hulls from other types of nuts as well as hulls from grain wherein the material is fed into the separator, the heaviest constituents fall through the separator by gravity and the lighter constituents are carried upwardly by means of a pipe or other conduit having a partial vacuum created therein.

A further object of the invention is to provide a separator of the type above described having at least three adjusting means whereby the velocity of air coming into the machine from two directions is adjustable, and whereby by means of a third adjustment the feed of the material through the machine and the air around the vacuum intake pipe may be adjustable.

An additional object of the invention is to provide a separator having a plurality of adjustments for the air inlet and adjustments for the material to which an agitator may be attached for use when the machine is separating lighter types of materials.

Other objects will be set forth throughout the specification.

In the drawings:

Figure 2 is an enlarged detail of the separator without the agitator.

Figure 3 is a perspective view of the agitator, and

Figure 4 is a bottom view looking upwardly showing the relative positions of the agitator and the outer collars of the separator.

Figure 1:
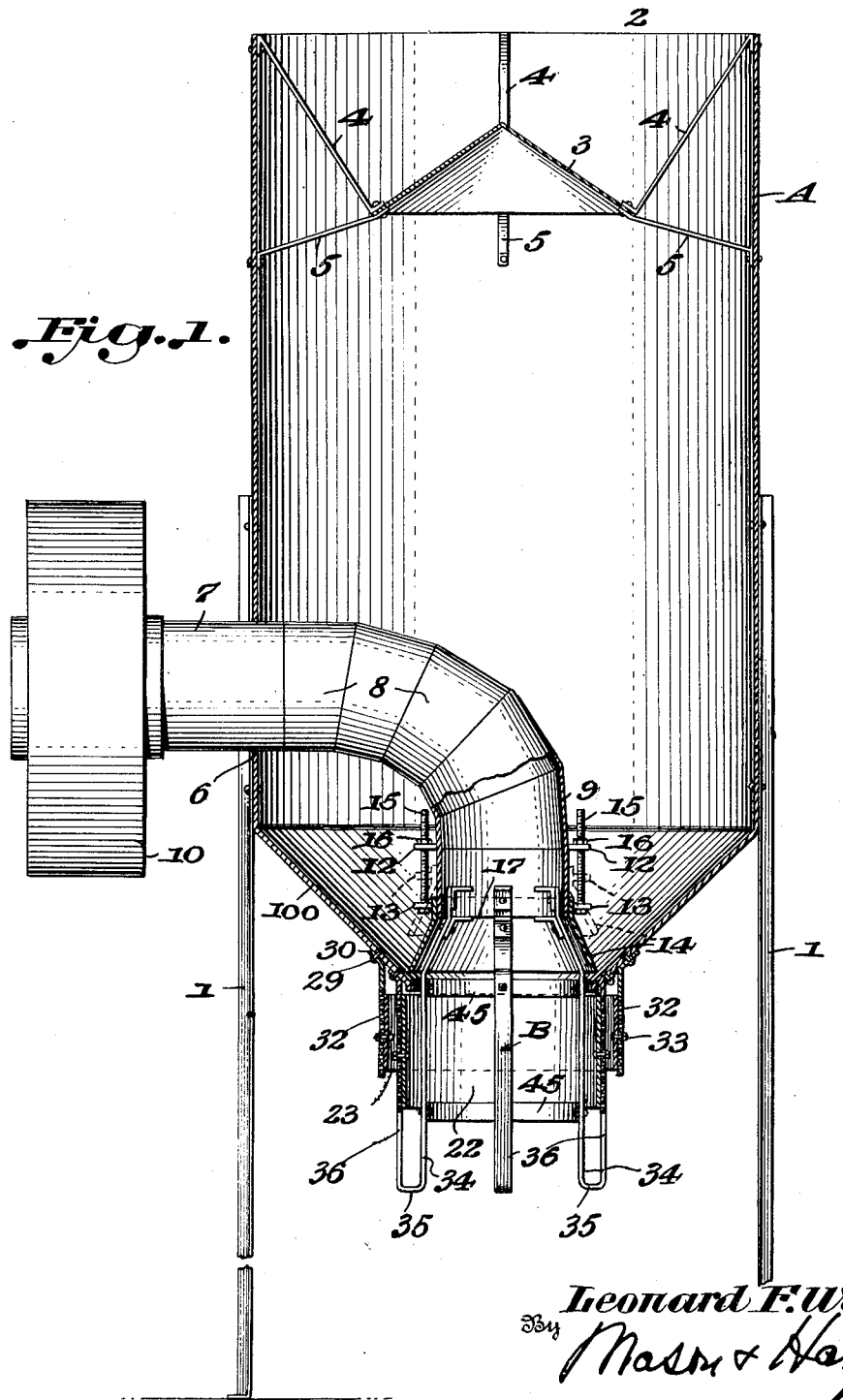
Figure 1 is a vertical sectional view of the machine with the agitator attached.

The need for a separator for separating agricultural products, in which provision is made for a wide latitude of adjustments, exists today as never before. As an example, it has been customary to package peanut hulls as they are separated from the peanut kernels and sell these packages to the farmers who use the peanut hulls for bedding chickens. Peanut hulls as thus obtained have sheep burs mixed in with them. Sheep burs resemble, in size and shape, small bugs such as beetles, and when the peanut hulls are used to bed chickens, the chickens mistake the sheep burs for beetles and proceed to eat the sheep burs with the results that the burs, due to the spines on them, lodge in the chickens' throats, resulting in killing a large number of chickens. Because of this condition farmers have been deterred from purchasing this inexpensive and otherwise practical material for bedding chickens.

This invention will readily separate the sheep burs from large quantities of peanut hulls in a continuous operation, and will also separate heavier material such as peanuts, grains from their hulls, upon being adjusted.

In the drawings A indicates the separator casing as a whole. The separator is provided with supporting legs 1 for the straight side walls thereof having an open top 2 for the ingress of the material to be separated. Located beneath the top 2 is a cone 3 which is supported by arms 4 and 5 in spaced relationship with the vertical sides of the container, as seen in Figure 1. In the circular side of the separator is an aperture 6 for the reception of conduit means which may consist of a pipe 7 having intermediate pipe sections 8 and a lower or end section 9. The bottom part of the casing is in the shape of a cone 100 having a bottom portion 21 with an opening 20 therein.

Adjacent the inlet of the pipe 7 is a blower indicated by the numeral 10 for creating air suction in the pipe 7. It is to be expressly understood that the conduit means instead of extending through the side of the casing may extend straight upwardly substantially centrally of the casing and out through the open top 2.

The end pipe section 9 is preferably provided with a circular flange 12. Forming a close fit with the lower pipe section is the bell shaped collar 14 which is also provided with a circular flange 13. The bell shaped collar is supported by means of these flanges and headed lag bolts 15 which extend through the flanges in spaced relationship and upon which are threaded nuts 16 which rest on the flange 12. As seen in Figure 2, the end pipe section 9 has an opening 17, this opening, in most adjustments of the bell, extends into but not below the lower end 18 of the bell. The lower end of the bell 18 is adjustable toward and from the inner converging surface 19 of the cone 100 and it will be noted that the upper portion of the bell forms a fairly tight sliding fit with the exterior peripheral surface of the lower pipe section 9.

The lower end of the cone is provided with a combined material exit and air inlet opening 20 having a lower portion 21, and the exterior surface of the cone preferably supports the adjustable construction collars 22 and 23. The inner collar may be conveniently supported on the exterior of the cone by a plurality of fastening means 24 for supporting a flange 25 having a depending arm 26 provided with a plurality of perforations 27 through which is adjustably adapted to extend a plurality of threaded bolts with nuts on the end of the same. These extend through suitable apertures in the inner collar of the concentric collars and through perforations 27 in the depending arm 26. The upper concentric collar 23 is supported by the cone by suitable means such as headed rivets 29, each of which extends through the flange 30 having a depending arm 31 provided with a plurality of apertures 32 for the reception of headed bolts 33.

The agitator B, as shown in Figures 1, 3 and 4, preferably comprises a plurality of vertical arms 34 having feet 35 and extensions 36. These extensions each have a plurality of vertically spaced apertures 37 by means of which the agitator may be attached in proper adjusted position to the bolts 28 as shown in Figure 1. Each vertical arm 34 has an inwardly inclined portion 38 terminating in a short vertical extension 39. Each short vertical extension is provided with an agitator blade 40, the blades being preferably horizontally arranged and extending toward each other as shown in Figure 3. The sides of the blades may be attached to the short vertical extensions by rivets or bolts 41. Spaced below these blades 40 are lower blades 42, each blade having a horizontal portion and an extension 43 which is attached to the inclined portion 38 of each vertical arm 34 by means of rivets or bolts 44.

These arms are attached to each other by means of adjustable bands 45, and there may be two or more of these bands, as explained hereinafter. Each band is attached to the vertical arm 34 by means of bolts 49. The ends of each of the bands are adjustable by means of slots 46 and a headed screw-threaded bolt 47 with a nut threaded on the bolt, as shown in Figure 3. One of the ends of each band is also provided with a plurality of apertures 48. In the event it is desired to open the bands beyond the ends of the slots 46, the bolts 47 are adjustably fitted in one of the apertures 48. The bands are further held in position by headed bolts 49, each of which has screw-threads upon which a nut 50 is threaded.

When the separator is used as an attachment to a harvester, such as a peanut thresher, and when the separator is used to handle other coarse materials such as grains, the agitator is not used, and the construction then used will be that illustrated in Fig. 2. In order, however, to obtain a very accurate separation of materials of weights which are substantially the same, the agitator is used as shown in Fig. 1.

*Operation*

If the separator is attached to a peanut threshing machine, the material from the peanut threshing machine is fed into said opening 2, and this material includes some peanuts, vines, string and other deleterious material. It moves down the straight sides and engages the converging surfaces 19 of the cone 100. It is acted upon by the upwardly moving air, which air moves upwardly at great velocity into the opening 17 of pipe 9 where it reaches the point near the opening 18 of the bell. It is further acted upon by the currents of air which find their way between the lower edge 21 of the cone opening 20 and the upper peripheries of the collars 22 and 23.

The solid substances fall into a suitable receptacle placed beneath the opening 21 and the lighter constituents are carried upwardly into the pipe 7.

It will be noted that the cone shaped separator has a tendency to equally distribute the peanut hulls around the entire cone-shaped bottom of the cleaner. Under the conditions of separating peanut hulls, the adjustments are as follows: The bell-shaped collar is attached to the lower end of the air pipe and fits snugly around the lower pipe section 18 and may be adjusted by the lag bolts so as to regulate the intensity of the air passing between the cone-shaped bottom surface 19 of the cleaner and the outer lower edge 18 of the bell-shaped collar. The purpose of this adjustment is to allow the exact amount of air pressure to act on the material as it passes between the inclined surface 19 and the lower edge 18 of the bell-shaped collar.

When it is desired to clean peanut hulls to get out of them the sheep burs and peanuts, the end of the bell-shaped collar is adjusted in about a medium position inasmuch as the material is of medium to light weight, and the two collars 22 and 23 which are attached to the outer surface of the cone are also adjusted to about a medium point. Unless the peanut hulls, which are moving downwardly on the surface 19, are broken up they will tend to come to a single point and fall directly to the floor. The collars 22 and 23, however, serve to permit regulated amounts of air to pass between the lower opening of the cone and the upper circular edges of each of the collars. This air breaks up and changes the direction of the material, thus permitting the lighter material to pass up the suction pipe and the heavier material to fall inside the circular walls of the collars in a substantially vertical direction to the floor or receptacle positioned beneath the collars. The above adjustments apply when separating coarser grades of peanut hulls and peanut vines, together with other stringy materials as they are discharged from the threshing machine. With the adjustments stated above at the medium point, the hulls, vines and strings and other like material will pass up the pipe and allow the peanuts and sheep burs to pass downwardly.

When treating finer ground peanut hulls and peanut hulls which are more or less regular in size, texture, and weight, said hulls being without an extensive amount of fibrous material such as vines, strings, etc. I further prefer to use the above machine adjusted as hereinafter described and with the agitator shown in Figure 3 attached in substantially the position shown in Figure 4. This agitator consists of one or more substantially horizontal bands 45, preferably at least two in number. The agitator is adjusted so that the blades, at least the upper ones 40, are located within the bell-shaped collar 14. As the material slides down the sloping walls of the cone it comes to the space between the lower edge of the bell 18 and the converging surface 19 where it is immediately acted upon by the air. The air engages the material and turns it back up toward the inlet 17 of the pipe. The material then strikes the bands 45 and is scattered, thus making it possible for the air to penetrate all parts of the now separated material and to further separate this material. The lighter material is then carried up the pipe and the heavy material is dropped to the floor or container beneath the collars 22 and 23.

There is no centrifugal action which takes place in either the air or the material in the operation of the present machine. The agitator is used solely when fine, or heavy and fine material are used, but is not used in cleaning coarse material such as peanut hulls with vines, strings, etc.

The separator is used without the agitator for cleaning all types of grains in which may be found very coarse material including vines, stems, stalks and the like. The present separator is not adapted to clean cotton but will clean substantially all other types of farm-grown materials.

The bell-shaped collar has its principal purpose in adjusting the intensity of the suction around the inlet 17 of the pipe 9. For very heavy grain, peanuts, corn, wheat, etc. the bell-shaped collar is adjusted in a downward direction and toward the surface of the cone.

It is to be understood that the adjustments made to collars 22 and 23 and to the agitator B and conduit 14 are different for each type of material that is inserted in the separator casing. The following is a detailed description of the various adjustments that might have to be made depending upon the material chosen to be cleaned and separated. The bell 14 is adjusted vertically downwardly so that there will be the correct space between section 18, part 14 and conical wall 100, and the collars 22 and 23 are adjusted vertically until the upper top edges of collars 22 and 23 fit snugly around the lower conical floor of lower conical wall 100. After this adjustment is made, practically all of the material that is to be separated will be drawn into the pipe section by suction pipe 10 and only the heaviest pieces will be removed to the bin (not shown) below the separator. In order to provide proper separating and cleaning of the material, usually it is necessary to further adjust the collars 22 and 23. When the collars 22 and 23 are moved vertically downward, the direct intense upright suction of air current is broken off, and as a result the air entering into the opening 18 of the bell 14 comes from five distinct sources. The first source is the major inlet between point 18 of part 14 and part 100. The second source is the air that enters horizontally and slightly downwardly over the top part of collar 22 through the open space between the top part of 22 and part 20. The third source is the second incoming flow of air taken in around the lower or bottom part of collar 22 which controlled flow of air quickly emerges with the last described air coming in over the top part of 22. The fourth source is the incoming air which materially effects the air flow of the aforesaid first, second and third sources and which enters the separator over the top part of collar 23. In order for this source to be effective, collar 23 must be vertically adjusted higher than the top part of collar 22 and adjusted horizontally outwardly and away from collar 22. Thus the air flowing in over the top part of collar 23 travels horizontally inwardly and downwardly through an open space before it makes contact with the air flow taken in at the top part of collar 22. The fifth source is the air drawn up and around the bottom vertical part of collar 23 into an air pocket between collars 22 and 23. This is a neutral air space which helps to hold back the flow of air being taken in directly over the top part of collars 22 and 23. The five above described air sources make it possible for a connection of vibrating friction to exist between parts 22, 23 and 14, and it is by performing the above outlined critical adjustments that this separator becomes particularly efficient in regard to cleaning and separating a certain type of material.

When using the agitator and when treating coarse grain which is reasonably clean, the bands 45 of the agitator are open so that the agitator fits nearer to the lower edge of the opening 21 of the cone, but when finer material is used, the bands are pulled a little farther in.

It will be understood that the showing in the drawings and the above description of the present invention is for illustration and not for restricted purposes. For instance, the collars 22 and 23 and the agitator may be supported from the floor which supports the legs 1. The bell pipe section may be cylindrical in shape, although I prefer that it be of a flaring configuration. The converging surface may be of other shape than that shown. It will be further appreciated that the principal features of the present invention include the casing with a bottom opening and a suction pipe extending adjacent this opening, an adjustable pipe section fitting the lower end of the pipe and adjustable toward the bottom opening of the casing, together with a plurality of collars located below the casing bottom opening.

The preferred embodiments of my invention having been fully described, what I claim is new and desire to secure by Letters Patent is:

1. In a separator, the combination of an upright casing having an inside surface, means for distributing material adjacent the said inside surface of said casing, conduit means extending into said casing having a vertical inlet end located substantially centrally of casing, said casing having a combined outlet opening for the downward movement of coarse material and for the upward movement of air, said conduit opening and said combined casing opening being spaced vertically from each other with the said combined casing opening being located below and coaxially of said conduit inlet opening, said casing having conical walls at the lower end thereof terminating in said combined opening, a downwardly flaring bell-shaped collar having its upper portion closely surrounding said conduit means, and its lower peripheral edge located substantially adjacent to said casing combined opening and to said conical walls of said casing, means for withdrawing air through said conduit and across the opening formed by said peripheral edge and about the circular space between said lower peripheral edge and said conical walls, means for vertically adjusting said bell-shaped collar on said conduit means whereby to adjust the size of said opening between the lower peripheral edge of said bell-shaped collar and said conical walls, a pair of spaced concentric collars surrounding and being radially spaced from each other to provide a cylindrical air space, means for positioning said concentric collars below the casing and adjacent and coaxially of said combined casing opening and for individually, vertically adjusting each of said concentric collars with relation to each other and vertically toward or away from said combined opening whereby the adjustment of the lower peripheral edge of said bell-shaped collar and adjustment of said concentric collars regulates the flow and distribution of air adjacent the lower peripheral edge of said bell-shaped collar and said conical wall and also below said combined casing opening, the space below the opening and the collars being unobstructed, the diameters of said inner concentric collars being at least as large as the diameter of said combined casing opening.

2. In a separator, the combination of an upright casing having an inside surface, means for distributing material adjacent the said inside surface of said casing, conduit means extending into said casing having a vertical inlet end located substantially centrally of casing, said casing having a combined outlet opening for the downward movement of coarse material and for the upward movement of air, said conduit opening and said combined casing opening being spaced vertically from each other with the said combined casing opening being located below and coaxially at said conduit inlet opening, said casing having conical walls at the lower end thereof terminating in said combined opening, a downwardly flaring bell-shaped collar having its upper portion closely surrounding said conduit means, and its lower peripheral edge located substantially adjacent to said casing combined opening and to said conical walls of said casing, means for withdrawing air through said conduit and across the opening formed by said peripheral edge and about the circular space between said lower peripheral edge and said conical walls, means for vertically adjusting said bell-shaped collar on said conduit means whereby to adjust the size of said opening between the lower peripheral edge of said bell-shaped collar and said conical walls, a pair of spaced concentric collars surrounding and being radially spaced from each other to provide a cylindrical air space, means for positioning said concentric collars below, adjacent, coaxially of and laterally beyond said combined casing opening, and for individually, vertically adjusting each of said concentric collars with relation to each other and vertically toward or away from said combined opening whereby the adjustment of the lower peripheral edge of said bell-shaped collar and adjustment of said concentric collars regulates the flow and distribution of air adjacent the lower peripheral edge of said bell-shaped collar and said conical wall and also below said combined casing opening, the space below the opening and the collars being unobstructed.

3. In a separator, the combination of an upright casing having an inside surface, means for distributing material adjacent the said inside surface of said casing, conduit means extending into said casing having a vertical inlet end located substantially centrally of casing, said casing having a combined outlet opening for the downward movement of coarse material and for the upward movement of air, said conduit opening and said combined casing opening being spaced vertically from each other with the said combined casing opening being located below and coaxially of said conduit inlet opening, said casing having conical walls at the lower end thereof terminating in said combined opening, a downwardly flaring bell-shaped collar having its upper portion closely surrounding said conduit means, and its lower peripheral edge located substantially adjacent to said casing combined opening and to said conical walls of said casing, means for withdrawing air through said conduit and across the opening formed by said peripheral edge and about the circular space between said lower peripheral edge and said conical walls, means for vertically adjusting said bell-shaped collar on said conduit means whereby to adjust the size of said opening between the lower peripheral edge of said bell-shaped collar and said conical walls, collar means including at least one collar, means for positioning said collar means below, adjacent and coaxially of and radially beyond said combined casing opening and for vertically adjusting said collar means vertically toward or away from said combined opening whereby the adjustment of the lower peripheral edge of said bell-shaped collar and the adjustment of said collar means regulates the flow and distribution of air adjacent to the edge of the bell-shaped collar and the conical wall and also below said combined casing opening, the space below the opening and said collar means being unobstructed, the diameter of said collar means being greater than the diameter of the combined casing opening.

4. In a separator, the combination of an upright casing having an inside surface, means for distributing material adjacent the said inside surface of said casing, conduit means extending into said casing having a vertical inlet end located substantially centrally of casing, said casing having a combined outlet opening for the downward movement of coarse material and for the upward movement of air, said conduit opening and said combined casing opening being spaced vertically from each other with the said combined casing opening being located below and coaxially of said conduit inlet opening, said casing having conical walls at the lower end thereof terminating in said combined opening, a downwardly flaring bell-shaped collar having its upper portion closely surrounding said conduit means, and its lower peripheral edge located substantially adjacent to said casing combined opening and to said conical walls of said casing, means for withdrawing air through said conduit and across the opening formed by said peripheral edge and about the circular space between said lower peripheral edge and said conical walls, means for vertically adjusting said bell-shaped collar on said conduit means whereby to adjust the size of said opening between the lower peripheral edge of said bell-shaped collar and said conical walls, and a stationary agitator means having a plurality of members extending parallel across said conduit means and located adjacent said bell-shaped collar, and within the upwardly flowing stream of air collar means, means for positioning said collar means below, adjacent, and coaxially of, and radially upon said combined casing opening, means for vertically adjusting said collar means toward or away from said combined opening whereby the adjustment of said collar means regulates the flow and distribution of air below said combined casing opening, the space below the opening and the said collar means being unobstructed, the diameters of said collar means being greater than the diameter of the combined casing opening.

5. In a separator, the combination of an upright casing having an inside surface, means for distributing material adjacent the said inside surface of said casing, conduit means extending into said casing having a vertical inlet end located substantially centrally of casing, said casing having a combined outlet opening for the downward movement of coarse material and for the upward movement of air, said conduit opening and said combined casing opening being spaced vertically from each other with the said combined casing opening being located below and coaxially of said conduit inlet opening, said casing having conical walls at the lower end thereof terminating in said combined opening, a downwardly flaring bell-shaped collar having its upper portion closely surrounding said conduit means, and its lower peripheral edge located substantially adjacent to said casing combined opening and to said conical walls of said casing, means for withdrawing air through said conduit and across the opening formed by said peripheral edge and about the circular space between said lower peripheral edge and said conical walls, means for vertically adjusting said bell-shaped collar on said conduit means whereby to adjust the size of said opening between the lower peripheral edge of said bell-shaped collar and said conical walls, a pair of spaced concentric collars surrounding and being radially spaced from each other to provide a cylindrical air space, means for positioning said concentric collars adjacent and coaxially of said combined casing opening and for individually, vertically adjusting each of said concentric collars with relation to each other and vertically toward or away from said combined opening whereby the adjustment of the lower peripheral edge of said bell-shaped collar and adjustment of said concentric collars regulates the flow and distribution of air adjacent the lower peripheral edge of said bell-shaped collar and said conical wall and also below said combined casing opening, the space below the opening and the collars being unobstructed, the diameters of said inner concentric collars being at least as large as the diameter of said combined casing opening, and a stationary agitator means having a plurality of horizontally extending members, said members being located above said concentric collars.

6. In a separator, the combination of an upright casing having an inside surface, means for distributing material adjacent the said inside surface of said casing, conduit means extending into said casing having a vertical inlet end located substantially centrally of casing, said casing having a combined outlet opening for the downward movement of coarse material and for the upward movement of air, said conduit opening and said combined casing opening being spaced vertically from each other with the said combined casing opening being located below and coaxially of said conduit inlet opening, said casing having conical walls at the lower end thereof terminating in said combined opening, a downwardly flaring bell-shaped collar having its upper portion closely surrounding said conduit means, and its lower peripheral edge located substantially adjacent to said casing combined opening and to said conical walls of said casing, means for withdrawing air through said conduit and across the opening formed by said peripheral edge and about the circular space between said lower peripheral edge and said conical walls, means for vertically adjusting said bell-shaped collar on said conduit means whereby to adjust the size of said opening between the lower peripheral edge of said bell-shaped collar and said conical walls, collar means including at least one collar, means for positioning said collar means below, adjacent and coaxially of and radially beyond said combined casing opening and for vertically adjusting said collar means vertically toward or away from said combined opening whereby the adjustment of the lower peripheral edge of said bell-shaped collar and the adjustment of said collar means regulates the flow and distribution of air adjacent to the edge of the collar and the conical wall and also below said combined casing opening, the space below the opening and said collar means being unobstructed, the diameter of said collar means being greater than the diameter of the combined casing opening, and a stationary agitator means having a plurality of members, each of said members extending in a horizontal direction, said members being located above said collar means, and within the upwardly flowing stream of air.

7. In a separator, the combination of an upright casing having an inside surface, means for distributing material adjacent the said inside surface of said casing, conduit means extending into said casing having a vertical inlet end located substantially centrally of casing, said casing having a combined outlet opening for the downward movement of coarse material and for the upward movement of air, said conduit opening and said combined casing opening being spaced vertically from each other with the said combined casing opening being located below and coaxially at said conduit inlet opening, said casing having conical walls at the lower end thereof terminating in said combined opening, a downwardly flaring bell-shaped collar having its upper portion closely surrounding said conduit means, and its lower peripheral edge located substantially adjacent to said casing combined opening and to said conical walls of said casing, means for withdrawing air through said conduit and across the opening formed by said peripheral edge and about the circular space between said lower peripheral edge and said conical walls, means for vertically adjusting said bell-shaped collar on said conduit means whereby to adjust the size of said opening between the lower peripheral edge of said bell-shaped collar and said conical walls, a pair of spaced concentric collars surrounding and being radially spaced from each other to provide a cylindrical air space, means for positioning said concentric collars below, adjacent, coaxially of and laterally beyond said combined casing opening, and for individually, vertically adjusting each of said concentric collars with relation to each other and vertically toward or away from said combined opening whereby the adjustment of the lower peripheral edge of said bell-shaped collar and adjustment of said concentric collars regulates the flow and distribution of air adjacent the lower peripheral edge of said bell-shaped collar and said conical wall and also below said combined casing opening, the space below the opening and the collars being unobstructed, and a stationary agitator means including a plurality of sets of blades, each of said blades extending toward an oppositely positioned blade, and within the upwardly flowing stream of air.

8. In a separator, the combination of an upright casing having an inside surface, means for distributing material adjacent the said inside surface of said casing, conduit means extending into said casing having a vertical inlet end located substantially centrally of casing, said casing having a combined outlet opening for the downward movement of coarse material and for the upward movement of air, said conduit opening and said combined casing opening being spaced vertically from each other with the said combined casing opening being located below and coaxially of said conduit inlet opening, said casing having conical walls at the lower end thereof terminating in said combined opening, a downwardly flaring bell-shaped collar having its upper portion closely surrounding said conduit means, and its lower peripheral edge located substantially adjacent to said casing combined opening and to said conical walls of said casing, means for withdrawing air through said conduit and across the opening formed by said peripheral edge and about the circular space between said lower peripheral edge of said bell-shaped collar and said conical walls, a pair of spaced concentric collars surrounding and being radially spaced from each other to provide a cylindrical air space, means for positioning said concentric collars adjacent and coaxially of said combined casing opening and for individually, vertically adjusting each of said concentric collars with relation to each other and vertically toward or away from said combined opening whereby the adjustment of the lower peripheral edge of said bell-shaped collar and adjustment of said concentric collars regulates the flow and distribution of air adjacent the lower peripheral edge of said bell-shaped collar and said conical wall and also below said combined casing opening, the space below the opening and the collars being unobstructed, the diameters of said inner concentric collars being at least as large as the diameter of said combined casing opening, and a stationary agitator means having a plurality of horizontally extending members, said members being located above said concentric collars, said agitator means including a plurality of sets of blades, each of said blades extending toward an oppositely positioned blade, and means for adjusting said agitator means in a vertical direction in the air passageway formed by said combined opening, said bell-shaped collar, and said conduit means.

LEONARD F. WINSLOW.

REFERENCES CITED

The following references are of record in the file of this patent:

UNITED STATES PATENTS

| Number | Name | Date |
|---|---|---|
| 697,451 | Craik | Apr. 15, 1902 |
| 819,171 | Robinson | May 1, 1906 |
| 1,122,371 | Douglas | Dec. 29, 1914 |
| 1,264,024 | Davis | Apr. 23, 1918 |
| 1,445,760 | Drake | Feb. 20, 1923 |
| 1,465,884 | Vandervoort | Apr. 21, 1923 |
| 1,522,151 | Stebbins | Jan. 6, 1925 |
| 1,624,518 | Stebbins | Apr. 12, 1927 |
| 1,673,849 | Stebbins | June 19, 1928 |
| 1,916,762 | Hinsch | July 4, 1933 |
| 2,156,483 | Sallee | May 2, 1939 |